United States Patent
Shubs, Jr. et al.

(10) Patent No.: US 9,682,717 B2
(45) Date of Patent: Jun. 20, 2017

(54) RIDE THROUGH CONTROL SYSTEM HAVING USER INTERFACE

(71) Applicant: Electro-Motive Diesel, Inc., LaGrange, IL (US)

(72) Inventors: Alexander Shubs, Jr., Chicago, IL (US); Curtis Montgomery, Calumet City, IL (US); James David Seaton, Westmont, IL (US)

(73) Assignee: Electro-Motive Diesel, Inc., LeGrange, IL (US)

( * ) Notice: Subject to any disclaimer, the term of this patent is extended or adjusted under 35 U.S.C. 154(b) by 0 days.

(21) Appl. No.: 14/881,825

(22) Filed: Oct. 13, 2015

(65) Prior Publication Data

US 2017/0101116 A1    Apr. 13, 2017

(51) Int. Cl.

| G05D 1/00 | (2006.01) |
|---|---|
| B61L 27/04 | (2006.01) |
| G07C 5/02 | (2006.01) |
| G07C 5/08 | (2006.01) |
| B61L 27/00 | (2006.01) |

(52) U.S. Cl.
CPC .......... *B61L 27/04* (2013.01); *B61L 27/0083* (2013.01); *G07C 5/02* (2013.01); *G07C 5/0816* (2013.01)

(58) Field of Classification Search
CPC ................................. B61C 9/00; B61C 17/12
USPC ..................................................... 701/19, 36
See application file for complete search history.

(56) References Cited

U.S. PATENT DOCUMENTS

| 6,587,764 B2 | 7/2003 | Nickles et al. |
|---|---|---|
| 7,131,614 B2 | 11/2006 | Kisak et al. |
| 7,188,341 B1 | 3/2007 | Hawthorne et al. |
| 7,869,908 B2 | 1/2011 | Walker |
| 8,401,720 B2 | 3/2013 | Daum et al. |
| 8,942,868 B2 | 1/2015 | Kanner et al. |
| 9,014,884 B2 | 4/2015 | Pritchard et al. |

(Continued)

FOREIGN PATENT DOCUMENTS

| KR | 10-1223885 | 7/2012 |
|---|---|---|
| KR | 10-1352216 | 5/2013 |

OTHER PUBLICATIONS

U.S. Application entitled "Train System Having Malfunction-Based Trip Simulation" by Curtis Allen Swenson et al. filed on Oct. 13, 2015.

*Primary Examiner* — Gertrude Arthur Jeanglaud
(74) *Attorney, Agent, or Firm* — Finnegan, Henderson, Farabow, Garrett & Dunner, LLP (57) ABSTRACT

A ride through control system for a machine is disclosed. The ride through control system may include a sensor associated with an asset of the machine and configured to generate a signal indicative of an operating parameter of the asset. The ride through control system may also include a user interface associated with the machine and a controller in communication with the sensor and the user interface. The controller may be configured to display on the user interface a plurality of selectable ride through control levels, each being associated with a respective operating parameter threshold, receive via the user interface a user selection of one of the plurality of ride through control levels, and automatically generate a machine control signal based on the signal generated by the sensor and the respective operating parameter threshold associated with the user selection.

20 Claims, 5 Drawing Sheets

(56) References Cited

U.S. PATENT DOCUMENTS

2005/0227575 A1* 10/2005 Pierson ................ A63H 19/14
                                                                     446/93
2013/0261842 A1   10/2013  Cooper et al.
2014/0239127 A1    8/2014  Morris

* cited by examiner

FIG. 3

RIDE THROUGH CONTROL SYSTEM HAVING USER INTERFACE

TECHNICAL FIELD

The present disclosure relates to a control system, and more particularly, to a ride through control system having a user interface.

BACKGROUND

Machines, such as passenger vehicles, trains, airplanes, marine vessels, construction equipment, etc., include many components that are susceptible to wear and failure over time. For instance, trains operating on a railroad network may each include multiple associated assets, such as one or more locomotives and a series of linked rail vehicles that can, in some cases, span sections of rail over a mile long. Train assets may also include stationary wayside equipment located throughout the railroad network. Each asset can have multiple components that are susceptible to wear and failure over time, which, if not properly addressed, can lead to operational inefficiencies and possible economic penalties associated with delayed operations.

To help reduce instances of asset failure, diagnostic systems have been implemented that detect when operating conditions of assets exceed a threshold and automatically reduce train operations to levels that permit the train's mission to continue without the failure of compromised assets. In some situations, however, the train's mission may require the delivery of a valuable payload according to a strict schedule to avoid economic penalties for tardy delivery. In these situations, train operators or administrators may wish to continue the mission to avoid associated penalties despite being notified that certain operating conditions are outside of as particular threshold. However, when certain train operations are automatically reduced in response to detected operating conditions, such as when locomotive power output is reduced or the train is stopped, the train can be caused to miss its mission deadline and incur associated penalties.

One attempt to provide both automatic and manual control of a train is disclosed in U.S. Pat. No. 6,587,764 (the '764 patent) that issued to Nickles et al., on Jul. 1, 2003. In particular, the '764 patent describes a system for determining train and track conditions and allowing an operator or a controller to control train operations based on the train and track conditions. The system includes a number of onboard and wayside sensors that communicate operating conditions and other information to the train controller. Based on the information received from the sensors, the controller displays control settings and operating conditions to the operator via a display and generates optimized feedback control strategies of various operating parameters of the train, including throttle position, power produced, wheel slip, fuel economy, and locomotive shutdown. The controller allows operators to activate an automatic control mode, in which the controller automatically controls train operations according to its feedback control strategy. When automatic control is not activated, the operator is allowed to respond to control settings and operating conditions displayed by the controller or apply a control strategy suggested by the controller. When a response from the operator is not detected, the controller will apply automatic control based on its determined feedback strategy.

Although the system of the '764 patent may promote more frequent use of predetermined train control strategies, it may not be optimum. Specifically, while the system of the '764 patent may display operational information to an operator for manual control operations, the controller will automatically apply a control strategy if no action from the operator is detected. As a result, operators may be required to continually adjust control settings to prevent the initiation of automatic control at times when automatic control is not desired. This may require operators to devote time and attention to preventing the controller from engaging automatic controls and altering their desired manual control strategy when it conflicts with the automatic control strategy.

The disclosed is directed to overcoming one or more of the problems set forth above and/or other problems of the prior art.

SUMMARY OF THE INVENTION

In one aspect, the present disclosure is directed to a ride through control system for a machine. The ride through control system may include a sensor associated with an asset of the machine and configured to generate a signal indicative of an operating parameter of the asset. The ride through control system may also include a user interface associated with the machine and a controller in communication with the sensor and the user interface. The controller may be configured to display on the user interface a plurality of selectable ride through control levels, each being associated with a respective operating parameter threshold, receive via the user interface a user selection of one of the plurality of ride through control levels, and automatically generate a machine control signal based on the signal generated by the sensor and the respective operating parameter threshold associated with the user selection.

In another aspect, the present disclosure is directed to a method of controlling a machine. The method may include sensing an operating parameter of an asset associated with the machine, displaying a plurality of selectable ride through control levels, each being associated with a respective operating parameter threshold, receiving a user selection of one of the plurality of ride through control levels, and automatically generating a machine control signal based on the operating parameter and the respective operating parameter threshold associated with the user selection.

In yet another aspect, the present disclosure is directed to a ride through control system for a machine. The ride through control system may include a sensor associated with an asset of the machine and configured to generate a signal indicative of an operating parameter of the asset. The ride through control system may also include a user interface associated with the machine and a controller in communication with the sensor and the user interface. The controller may be configured to display on the user interface a plurality of selectable ride through control levels, each being associated with a respective operating parameter threshold. The plurality of ride through control levels may include a disabled threshold level under which the controller is allowed to disregard the operating parameter threshold, a normal threshold level associated with a standard operating parameter threshold, and one or more subsequent ride through control levels, each being associated with an adjusted operating parameter threshold that is different from the standard operating parameter threshold. The controller may be further configured to receive via the user interface a user selection of one of the plurality of ride through control levels and automatically generate a machine control signal based on the signal generated by the sensor and the respective operating parameter threshold associated with the user selection.

DETAILED DESCRIPTION

Figure 1:
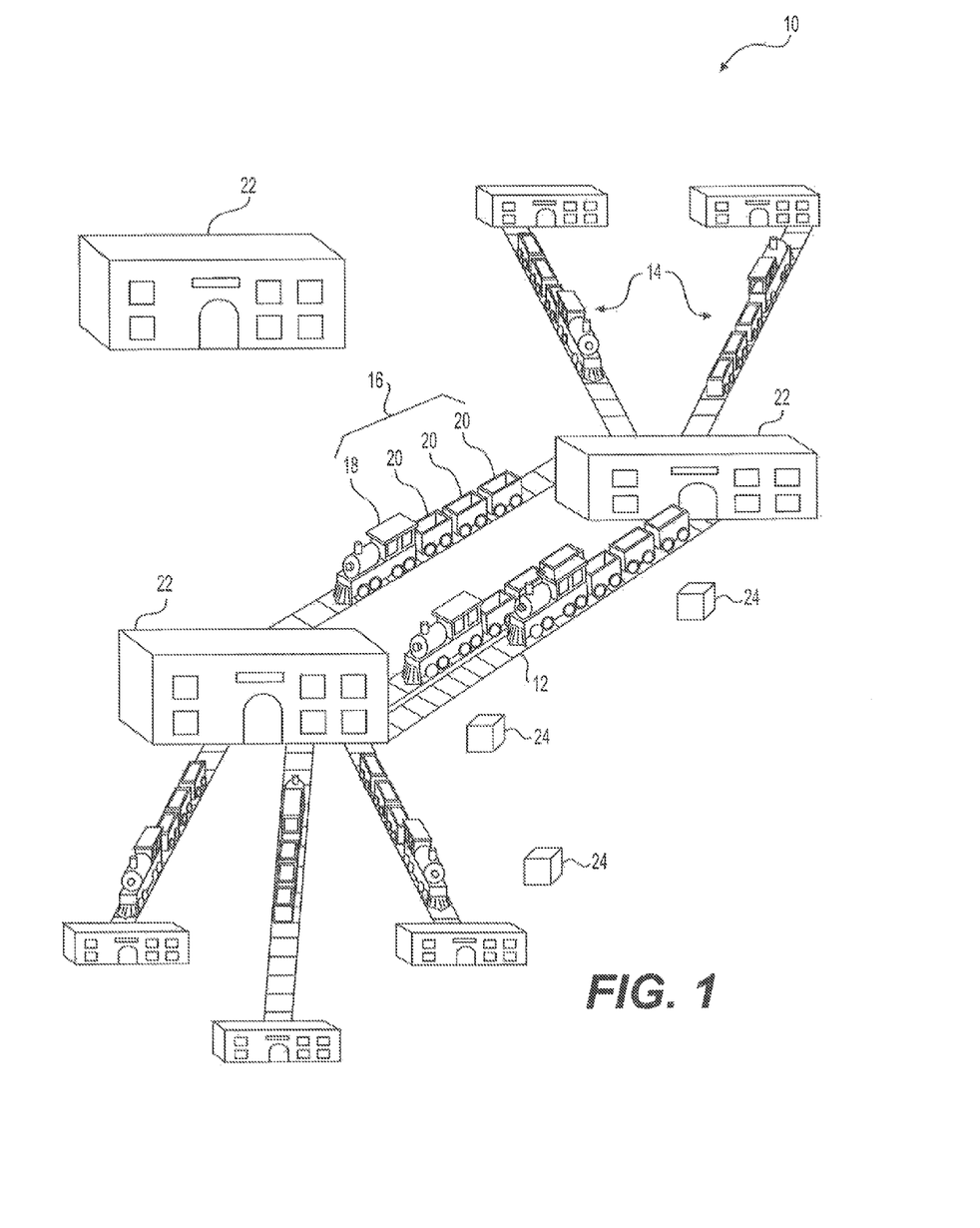
FIG. 1 is a schematic illustration of an exemplary disclosed machine network.

FIG. 1 schematically illustrates an exemplary railroad network 10. Railroad network 10 may include any number of tracks 12 that support a plurality of machines, such as trains 14. Tracks 12 may be, for example, railroad tracks, subway rails, trolley tracks, etc., on which trains 14 may travel. It is noted, however, that while railroad network 10 is depicted in FIG. 1 for purposes of this disclosure, other types of machine networks may be used in other embodiments. For example, in other embodiments, machine networks of individual machines (e.g., cars, haul trucks, construction machines, nautical vessels, aircraft, etc.) within certain operating boundaries (e.g., roads, waterways, airways, jobsites, etc.) may be used.

Trains 14 may each include one or more linked train assets (assets) 16 that are configured to travel in unison on tracks 12. Assets 16 may include locomotives 18, wagons 20, and/or other types of vehicles or containers that are configured to travel on tracks 12. For example, assets may include fuel-powered (e.g., diesel, natural gas, coal, etc.) locomotives, electric-powered locomotives, tender cars, passenger cars, boxcars, coal cars, tanker cars, etc. In other embodiments, assets 16 may include one or more machines operating together to complete a task, such as, for example, a group of construction machines on a jobsite, a group of haul trucks in a geographic region, a group of airplanes in a portion of airspace, etc.

A control station 22 may be located near or away from tracks 12 and used by operators and/or electronic controllers to oversee movement of trains 14 throughout railroad network 10. In some embodiments, control station 22 and/or its components may be located onboard one or more of trains 14. In other embodiments, control station 22 may be located off, board trains 14. For example, control station 22 may be located at a rail yard, a management facility, a port, or another location. Control station 22 may also or alternatively embody a computing device connected to a communication network, such as a special-purpose computer, a multi-purpose computer, a cellular phone, a tablet, or another type of stationary or portable computing device. Although only one control station 22 is illustrated in FIG. 1, it is contemplated that railroad network 10 may include any number of control stations 22, as desired.

In some embodiments, wayside equipment 24 may be positioned near or in the vicinity of tracks 12. Wayside equipment 24 may include various control devices, such as axle hot box detectors, wheel load detectors, track switches, speed restriction signs, signal lights, gates, scanners (barcode readers, RFID readers, etc.) or other devices configured to monitor and/or manage rail vehicle traffic in railroad network 10. For instance, control station 22 may send control signals to wayside equipment 24 to facilitate passage of trains 14 through railroad network 10 and receive information from wayside equipment 24 to facilitate monitoring of assets 16.

Figure 2:
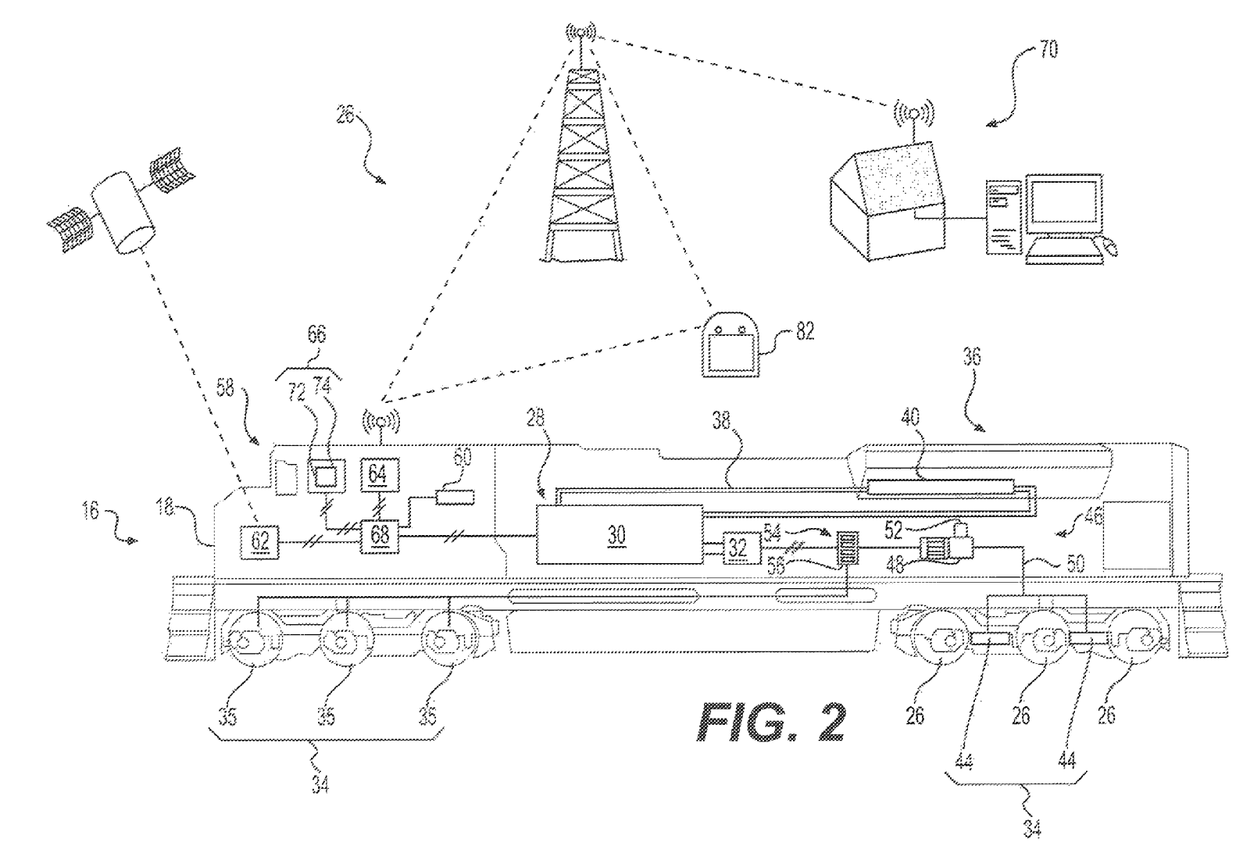
FIG. 2 is a schematic illustration of an exemplary disclosed machine asset and ride through control system that may be used in conjunction with the machine network of FIG. 1.

FIG. 2 shows an exemplary train asset 16 in communication with an exemplary disclosed ride through control system 26 that may be associated with railroad network 10 (referring to FIG. 1). For the purposes of this disclosure, asset 16 in FIG. 2 is depicted as a locomotive 18. However, it is noted that any type of asset 16, such as a wagon 20 or other equipment, such as wayside equipment 24, may be a train asset in communication with ride through control system 26.

Locomotive 18 may be a fuel-burning locomotive. For example, locomotive 18 may include an engine system 28 having one or more fuel-burning engines 30 (only one shown in FIG. 2). Engine 30 may be an internal combustion engine (e.g., a piston engine, a turbine engine, etc.) configured to burn a fuel (e.g., diesel, petrol, natural gas propane, kerosene, etc.) supplied by a fuel system 31 in order to generate a mechanical power output. The output of engine 30 may be used to drive a generator 32 (e.g., an AC generator, a DC generator, etc.) configured to supply electricity to a traction system 34 having one or more traction motors 35 for propelling locomotive 18 on a plurality of wheels 33 and axles (not shown). Engine 30 may alternatively be configured to directly drive wheels 33 with the mechanical output via drivetrain components, such as gears, clutches, torque converters, shafts, etc. In other embodiments, engine 30 may be a fuel-fired furnace (e.g., a coal furnace) configured to produce steam power for propelling locomotive 18.

A cooling system 36 may be configured to actively cool engine 30 and/or other components of locomotive 18. Cooling system 36 may include, for example, fluid conduits 38 that circulate a cooling fluid (e.g., water, a coolant, etc.) between a heat source (e.g., such as engine 30, generator 32, etc.) and a heat sink, such as a heat exchanger 40. Heat exchanger 40 may include a number of fluid passages configured to allow heated fluid therein to transfer heat to a cooler fluid (e.g., air, water, etc.) passing between or around the fluid passages. Cooling system may also include one or more cooling fluid pumps, valves (e.g., control valves, manual valves, etc.), fans, sensors, and/or other components.

Locomotive 18 may also include one or more brake systems 42 (only one shown in FIG. 2) configured to reduce the track speed of locomotive 18. For example, brake systems 42 may include one or more braking devices 44 positioned near a rotary component (e.g., a brake disk, brake drum, etc.). Braking devices may include a caliper and pads, shoes and linkages, magnetic brakes (e.g., eddy current brakes), or another type of braking device. As shown in FIG. 2, braking devices 44 may be actuated by a compressed air system 46. In other embodiments, braking devices may be powered hydraulically, mechanically, a combination thereof, or by another method. Locomotive 18 may also or alternatively include other types of braking systems, such as parking brakes, auxiliary brakes, electronically controlled pneumatic brakes, etc.

Compressed air system 46 may include one or more air compressors 48 (only one shown in FIG. 2) configured to pressurize air for use throughout locomotive 18. Pressurized air conduits 50 may be configured to transport pressurized air from compressor 48 to various devices within locomotive, such as braking devices 44, suspension equipment, etc. Compressor 48 may be driven by an electric motor 52 that may be powered by generator 32, a battery, or another source of electricity. In other embodiments, compressor 48 may be autonomously powered by a dedicated engine (e.g. a fuel-burning engine).

An electrical system 54 may supply and/or control electrical power to various electrical devices associated with locomotive 18. Electrical system 54 may supply electrical power via generator 32, a dedicated engine and generator, one or more batteries or battery banks, a connection to grid power, or another source of electricity. Electrical power may be distributed throughout electrical system 54 via one or more circuit breakers 56 (only one shown in FIG. 2). For example, electricity from generator 32 may be distributed to traction motors 35 via circuit breaker 56 for propelling locomotive 18. Electrical system 54 may also power a locomotive control system 58 and/or other electronic control devices. Electrical system 54 may include additional circuit breakers, fuses, receptacles, lights (e.g., headlights, running lights, interior lights, etc.), and or other components.

Control system 58 may include one or more components associated with manual and/or automatic control of locomotive 18 and/or train 14. For example, control system 58 may include one or more sensors 60, a locating device 62, a communication device 64, a user interface 66, and a controller 68 in communication with each of the other components. Controller 68 may also be in communication with and configured to selectively operate one or more actuators associated with the components of systems 28, 31, 34, 36, 42, 46, 54, and 58. Additional and/or other components of control system 58 may be included, if desired. Components of control system 58 may be configured to communicate by wired (e.g., dedicated wire, local area network (LAN), controller are network (CAN), wide area network (WAN), etc.) and/or wireless (e.g., WiFi, Bluetooth, cellular, satellite, RFID, etc.) connections.

Sensors 60 may be positioned throughout locomotive 18 and or other assets 16 of train 14 (referring to FIG. 1). Sensors 60 may each be configured to generate a signal indicative of an operating parameter and/or an operational status of an associated system, subsystem, and/or component of locomotive 18. Sensors 60 may be configured to generate signals indicative of, for example, temperature (e.g., a coolant temperature, an oil temperature, etc.), pressure (e.g., an oil pressure, a coolant pressure, an intake air pressure, etc.), position, current, voltage, presence (e.g., via optical sensors, cameras, etc.), air flow, fuel flow, exhaust constituents, air/fuel ratio, light intensity, etc. One or more sensors 60 may be associated with each of systems 28, 31, 34, 36, 42, 46, 54, 58, and/or other systems, subsystems, and/or components of locomotive 18. Signals generated by sensors 60 may also be indicative of an operational status of sensors 60 themselves and/or their associated systems, subsystems, and/or components. For example, the integrity, strength, and/or nature of the signals generated by sensors 60 may be indicative of whether the respective sensor and/or associated systems, subsystems, and/or components are functioning properly. Signals from sensors 60 may be communicated to controller 68 for further processing.

Locating device 62 may be configured to determine and communicate an absolute and/or relative geographic location of locomotive 18. For example, locating device 62 may include a Global Positioning System (UPS) transponder configured to receive position signals from one or more GPS satellites, an Inertial Reference Unit (IRU), or any other locating device known in the art. Locating device 62 may communicate the positioning signals and/or other information to controller 68 for further processing.

Communication device 64 may include any device configured to facilitate communications between controller 68 and off-board entities, such as an off-board system 70. Communication device 64 may include hardware and/or software that enables communication device 64 to send and/or receive data messages through a wireless communication link. Communication device 64 may be configured to communicate via wireless communication platforms, such as by satellite, cellular, infrared, Bluetooth, WiFi, and/or other wireless communication platforms. Communication device may also or alternatively be configured to communicate via a local area network (LAN) or another type of wired network that enables controller 68 to exchange information with off-board entities.

User interface 66 may be located inside an operator station of locomotive 18, and may include a data entry module 72 for manually receiving data from an operator and a display 74 for displaying information to the operator. Data entry module 72 may include a keyboard, mouse, touchscreen, directional pad, selector buttons, or any other suitable features for recording manually entered data. User interface 66 may also include one or more devices for controlling operations of locomotive 18 and/or train 14. For example, user interface 66 may include a throttle control, a brake control, a lighting control, and/or other controls. Control devices may embody levers, knobs, switches, buttons, slides, handles, touch screens, soft keys, and/or other types of controls. User interface 66 may also be configured to allow the operator to engage or communicate with train and/or train asset control systems. That is, information and requests for input from one or more control systems may be shown to the operator via display 74, and the operator may provide responses and/or other input via data entry module 72. Inputs entered via data entry module may be communicated to controller 68 for further processing.

Off-hoard system 70 may represent one or more computing systems associated with railroad network 10, control station 22, assets 16 (e.g., locomotives 18, wagons 20, wayside equipment 24, etc), and/or other components of railroad network 10. Off-board system 70 may be configured to allow a user to engage control system associated with trains 14 and/or train assets 16 in railroad network 10. Information and requests for input from one or more train and/or train asset control systems may be shown to the user via off-board system 70. Off-hoard system 70 may also be configured to allow the user to provide responses and/or other inputs to train and/or train asset control systems. Off-board system 70 may embody, for example, one or more of a laptop computer, a work station, a personal digital assistant, a mainframe, a cellular phone, a tablet, a computerized accessory (e.g., pair of glasses, a watch, etc.) and/or other computing systems known in the art.

Figure 3:
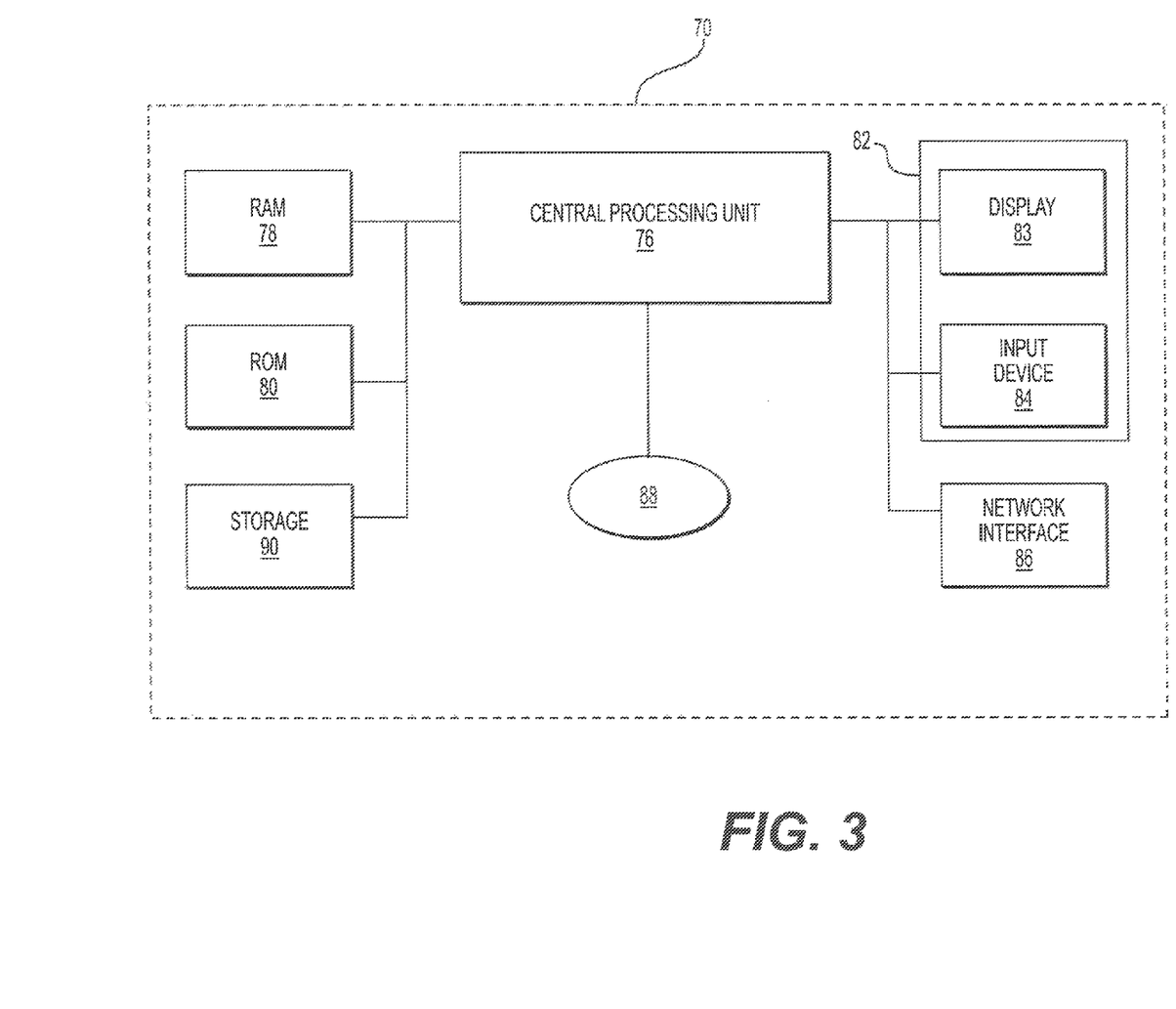
FIG. 3 is a diagrammatic illustration of an off-board control system that may be used in conjunction with the ride through control system of FIG. 2.

As shown in FIG. 3, off-board system 70 may include a central processing unit (CPU) 76, a random access memory (RAM) 78, a read-only memory (ROM) 80, a user interface 82, an input device 84, a network interface 86, a database 88 and storage 90. It is contemplated that off-board system 70 may include additional, fewer, and/or different components than those listed above. It is to be understood that the type and number of listed devices are exemplary only and not intended to be limiting.

CPU 76 may embody, for example, one or more specially-constructed or generic microprocessors configured to execute sequences of computer program instructions to perform various processes in connection with ride through control system 26. The computer program instructions may be loaded into RAM 78 for execution by CPU 76 from ROM 80. During operation, CPU 76 and/or controller 68 may cooperate via communication device 64 to carry out various processes in connection with ride through control system 26.

Storage 90 may embody any appropriate type of mass storage provided to store information that CPU 76 and/or controller 68 may access to perform various processes. For example, storage 90 may include one or more hard disk devices, optical disk devices, removable memory devices, solid state memory devices, flash memory devices, and/or other storage devices.

Off-board system 70 may be configured to interface with a user via user interface 82. User interface 82 may include a display 83 and input device 84. For example, user interface 82 may display information to users of off-board system 70 via display 83 and receive user inputs via input device 84. User interface 82 may be any appropriate type of display device, such as a computer monitor, laptop screen, cellular phone screen, etc. Input device 84 may include, for example, a keyboard, a mouse, a touch screen, buttons, soft keys, and/or other wired or wireless user interfaces known in the art.

Network interface 86 may facilitate wireless and/or wired communications such that off-board system 70 may be remotely accessed by controller 68 and/or other off-board systems (not shown). Network interface 86 may include and/or be associated with any suitable wired and/or wireless network architecture, such as, for example, a cellular telephone-based network (such as a PBX or POTS), a satellite-based network, LAN, WAN, CAN, a dedicated intranet, the Internet, and/or any other suitable network architecture known in the art.

Database 88 may contain, among other things, information relating to each train 14, information relating to each asset 16, and/or information relating to operating conditions or operational states of each asset 16. For example, database 88 may store an up-to-date list of every train 14 and associated asset 16 operating in railroad network 10. Database 88 may also store an up-to-date list of every system (e.g., systems 28, 31, 34, 36, 42, 46, 54, and 58) and/or component associated with each asset 16 and known data associated with each asset 16. For example, database 88 may store the latest information for each asset 16, such as, for example, a name, a serial number, a software version number, a system list, a component list, a part number list, and/or a date of manufacture for the asset. The train information and asset information may be kept current by, for example, automatic or manual electronic updates and/or by an authorized user of off-board system 70.

The information contained in database 88 may include operational and/or diagnostic information that can be used to control each asset 16 and/or associated systems and components. For example, the operational and/or diagnostic information may include tables of fault codes and associated triggering mechanisms, such as, signal criteria (e.g., strength, integrity, on/off, etc.), operating parameter thresholds (e.g., threshold temperatures, pressures, fluid levels, times, etc.), and or other triggers. Each fault code may correspond to or be indicative of an issue pertaining to a type of asset, an asset system, a system component, or maintenance aspect. Triggering mechanisms may be monitored or detected via sensors 60, wayside equipment 24, operators, and/or other diagnostic devices.

It should also be noted that a different number and/or different types of databases may be included within off-board system 70 and utilized by CPU 76, if desired. It is further contemplated that the information described above as being stored in database 88 may additionally or alternatively be stored within the memory of CPU 76 or elsewhere in off-board system 70, if desired. At least some of the information described as contained within database 88 may be additionally or alternatively stored on controller 68, if desired.

Controller 68 (referring to FIG. 2) may embody, for example, an electronic control module (ECM), or another processor capable of executing, and/or or outputting control signals in response to received and/or stored data. Controller 68 may include means for accessing, reading, and processing stored information and for displaying such information by way of user interface 66 and/or 82. For example, controller 68 may embody a single microprocessor or multiple microprocessors that include a means for monitoring input from user interfaces 66, 82, and/or sensors 60. Controller 68 may include a memory, a secondary storage device, and a processor, such as a central processing unit or any other means for accomplishing a task consistent with the present disclosure. Commercially available microprocessors can be configured to perform the functions of controller 68. It should be appreciated that controller 68 could readily embody a general machine controller capable of controlling numerous other machine functions. Various other known circuits may be associated with controller 68, including signal-conditioning circuitry, communication circuitry, and other appropriate circuitry.

Controller 68 may be configured to continually receive signals from sensors 60 and automatically generate control signals based on the signals from sensors 60. For example, controller 68 may control operations of assets 16 according to a feedback control strategy. That is, controller 68 may monitor operating parameters of assets 16 (as indicated by signals from sensors 60) and generate control signals to actuate components of assets 16 in order to maintain the operating parameters at or within a range of set point and/or threshold values. For example, controller 68 may control actuators associated with operating parameters, such as engine speed, fuel pressure, and coolant temperature, based on a stored control strategy and signals from respective associated sensors 60 in order to maintain each operating parameter within a desired working range.

Some control strategies may include asset protection provisions, whereby asset operations are automatically derated or otherwise reduced in order to protect assets 16 from entering an overrun condition and sustaining damage. For example, when controller 68 detects via sensors 60 that the coolant temperature, oil temperature, crankcase pressure, or another operating parameter associated with asset 16 has exceeded a threshold, controller 68 may be configured to automatically reduce engine power (e.g., via a throttle control) to allow asset 16 and train 14 to continue the current mission with a reduced probability of failure. In some cases, controller 68 may be configured to fully derate asset 16 and/or bring train 14 to a complete stop to prevent damage to asset 16 in response to signals generated by sensors 60. In this way, controller 68 may automatically exercise asset protection provisions of its control strategy to reduce incidents of debilitating failure and the costs of associated repairs.

At times, however, the costs associated with failing to complete a mission on time can outweigh the costs of repairing asset 16. In these situations, managers of trains 14 may wish to temporarily modify or disable asset protection provisions associated with automatic control of assets 16 to allow train 14 to complete its mission on time. However, managers having the responsibility or authority to make operational decisions with such costly implications may be off-board train 14 and/or away from a control station 22 or other network access point. To avoid unnecessary delays in reaching a decision to temporarily modify or disable asset protection provisions of automatic train control, controller 68 may be configured to facilitate the selection of ride through control levels via user interface 66, 82

Figure 4:
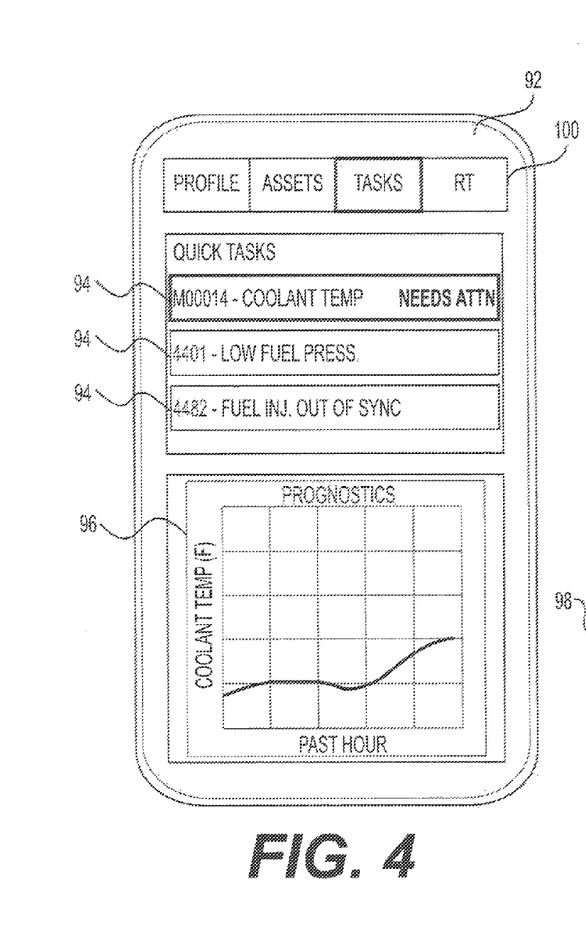
FIGS. 4-7 are pictorial illustrations of exemplary disclosed graphical user interfaces (GUI) that may be used in conjunction with the ride through control system of FIG. 2.

For example, as shown in FIG. 4, user interface 66, 82 may include a GUI 92 configured to display information and receive user inputs associated with train 14, GUI 92 may be a graphic display tool including menus (e.g., drop-down menus), modules, buttons, soft keys, toolbars, text boxes, field boxes, windows, and other means to facilitate the conveyance and transfer of information between a user and off-board system 70 and/or controller 68 (referring to FIG. 2). It is to be appreciated that controller 68 may require user authentication, such as, for example, a username, a password, a pin number, an electromagnetic passkey, etc., to display certain information and/or functionalities of GUI 92.

Information displayed by controller 68 via GUI 92 may include one or more maintenance messages 94. Each maintenance message 94 may be based on the signal generated by one of sensors 60 and indicative of information associated with a particular asset system, subsystem, or component. For example, maintenance messages 94 may indicate which train 14, asset 16, system, subsystem, or component is at issue, as well as an indication of its operational status (e.g., "satisfactory," "attention," "failed," etc). Maintenance messages 94 may also be associated with and/or indicative of a fault code activated in conjunction with signals from sensors 60. In some embodiments, each maintenance message 94 may also include information associated with tasks, notes, reminders, requests, orders, instructions, and/or other information entered by another user, operator, manager, technician, etc. Maintenance messages 94 may be listed according to a desired priority scheme, such as by operational status, message date, message type, etc.

Controller 68 may be configured to display prognostic information 96 in addition to and/or in conjunction with each maintenance message 94. Prognostic information may include a chart, table, image, or other type of graphical data display configured to convey information relating to operating parameters of asset 16. In some embodiments, prognostic information 96 may be displayed in response to a user selection of a maintenance message 94 and may include information relating to the selected maintenance message 94. In other embodiments, GUI 92 may be configured to allow the user to populate prognostic information 96 with different data by swiping an area of GUI 92, scrolling a scroll bar, opening a menu, or performing another type of selection operation. Prognostic information 96 may include historic data generated by one or more of sensors 60 (referring to FIG. 2) and may be associated with the generation of the selected maintenance message 94. Prognostic information 96 may be indicative of trending parameter behavior over a period of time (e.g., the past hour, the past day, week, or month, the past shift, etc.).

Figure 5:
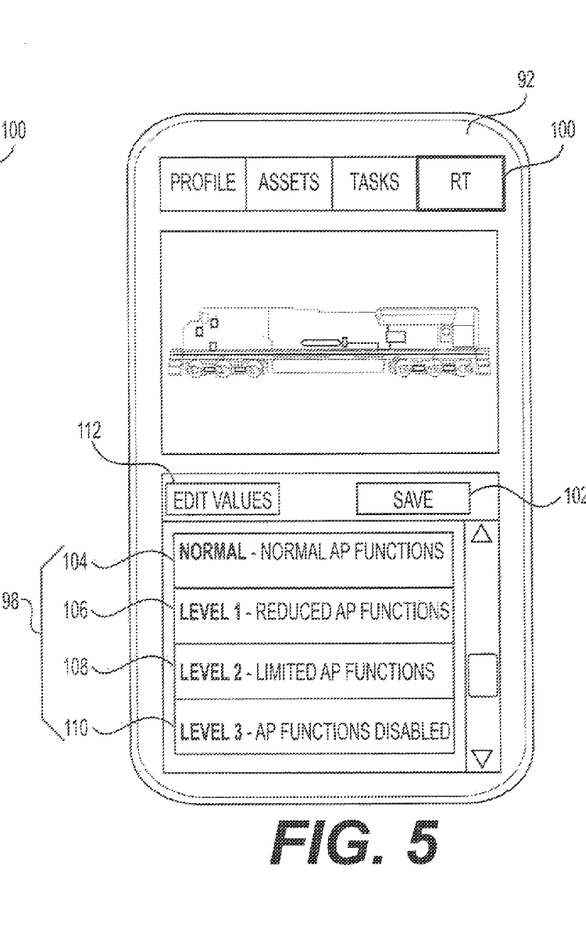

Prognostic information 96 and/or maintenance messages 94 may provide the user with information regarding the performance of asset 16 from which further decisions may be made. When the user decides to reduce the asset protection functionality of automated train controls to allow train 14 to continue operations at current performance levels, the user may view ride through control options via GUI 92. For example, as shown in FIG. 5, controller 68 may be configured to display on GUI 92 a plurality of selectable ride through control levels 98 for overriding automated control functions. In some embodiments, ride through control levels 98 may be accessed by selecting a ride through menu button 100 on GUI 92. In other embodiments, ride through control levels 98 may be accessed via a user selection of a maintenance message 94 (referring to FIG. 4) or of another feature of GUI 92.

Controller 68 may also be configured to generate any of the above described information for display on a mobile electronic device. For example, when user interface 66, 82 is a mobile electronic device, such as a mobile computer, personal digital assistant, cellular phone, tablet, computerized watch, computerized glasses, etc., GUI 92 may be limited in size as compared to when user interface 66, 82 is associated with, for example, a personal computer, laptop, work station, etc. To allow users to quickly browse through available information and selection options, controller 68 may display any of the above described information in conjunction with labeled widows or tabs, scroll bars, swipeable graphics, or other computer-implemented functionality.

Ride through control levels 98 may be activated upon selection by the user via GUI 92. Controller 68 may also display a confirmation button 102 to allow the user to change the selected ride through control level 98 before confirming the selection prior to activation. Ride through control levels 98 may include any number of levels, as desired. For example, ride through control levels 98 may include a normal threshold level 104, a plurality of subsequent ride through control levels 106, 108 associated with decreased asset protection functionality, and a disabled threshold level 110 associated with the disablement of asset protection functions. Each ride through control level 98 may be associated with one or more operating parameter thresholds stored within the memory of controller 68 or an associated storage device.

For example, normal threshold level 104 may be associated with one or more standard operating parameter thresholds for asset 16. That is, when normal threshold level 104 is selected, controller 68 may be configured to automatically control train operations based on signals from sensors 60 and standard operating parameter thresholds stored within its memory or an associated storage device. When subsequent ride through control levels 106, 108 are selected, controller 68 may be configured to automatically control train operations based on signals from sensors 60 and adjusted operating parameter thresholds (i.e., different from the standard operating parameters associated with normal threshold level 104). Asset protection functionalities of the control strategy associated with controller 68 may also reference the adjusted operating parameter thresholds associated with subsequent ride through control levels 106, 108 to allow less restricted operations. When disabled threshold level 110 is selected, controller 68 may be allowed to disregard the operating parameter thresholds in conjunction with the asset protection functionalities of its imbedded control strategy, thereby allowing unrestricted operations. Although FIG. 5 shows four ride through control level choices (e.g., "normal," Level 1, Level 2, Level 3, etc.), it is understood that more, fewer, or other levels may be shown.

The thresholds associated with each subsequent ride through control level 106,108 may successively permit operating parameters of asset 16 to reach greater or lower threshold values during operation before controller 68 derates or otherwise limits the operations of asset 16. In this way, the selection of successive ride through control levels 98 may permit train 14 to continue its mission without being inhibited by the asset protection functionalities associated with controller 68. Thus, upon a user selection of a ride through control level 98, controller 68 may be configured to automatically generate a machine control signal based on the signals generated by sensors 60 and the respective operating parameter thresholds associated with the user-selected ride through control level 98.

Each of the plurality of ride through control levels 98 may selectable in conjunction with a user permission level. For example, controller 68 may determine which ride through control levels 98 may be displayed or selectable via GUI 92 based on a username, a password, a pin number, an electromagnetic passkey, or other credential of the user. For example, normal threshold level 104 may be generally selectable, while each subsequent ride through control level 106, 108 may require successively higher permissions, and disabled threshold level 110 may require maximum permissions. By allowing remote access to ride through control levels 98, users with permission to select ride through control levels 98 may be able to do so upon short notice, from any computational device connected to the network, and without the assistance of onboard personnel. Controller 68 may also be configured to display via GUI 92 a button 112 or other feature configured to allow users to edit, modify, or adjust details associated with each ride through control level 98.

Figure 6:
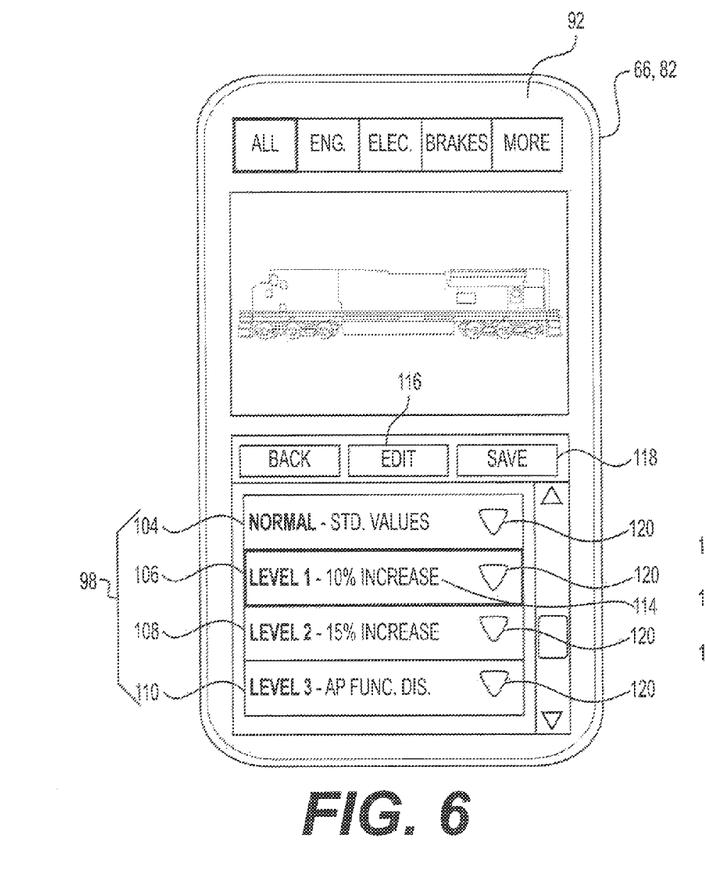

For example, with reference to FIG. 6, each subsequent ride through control level 106, 108 may be associated with an adjustment percent from the standard operating parameter thresholds associated with normal threshold level 104. That is, the adjusted operating parameters associated with each subsequent ride through control level 106, 108 may be equal to the operating parameters associated with normal threshold level 104 shifted (e.g., increased or decreased) by an assigned percentage value. Although percentage values of 10% and 15% are shown in FIG. 6, it is understood that different percentage values may be used, as desired.

Controller 68 may also be configured to receive via GUI 92 a user input indicative of a desired adjustment percent to be associated with a respective one of the subsequent ride through control levels 106, 108. For example, controller 68 may be configured to allow the user to select one of the subsequent ride through control levels 106, 108 and edit its associated adjustment percentage. In some embodiments, controller 68 may be configured to allow the user to type a percentage value into a text field 114 associated with one of the subsequent ride through control levels 106, 108. GUI 92 may also include an edit button 116 and/or a save button 118, which may be selectable prior to or following an editing operation, respectively. GUI 92 may also or alternatively include buttons 120 to activate dropdown menus for the selection of predetermined adjustment percentage options. Once edited percentage have been assigned to subsequent ride through control levels 106, 108, controller 68 may be configured to apply the edited adjustment percentage to the standard operating parameter thresholds when subsequent ride through control levels 106, 108 are selected in the future.

Figure 7:
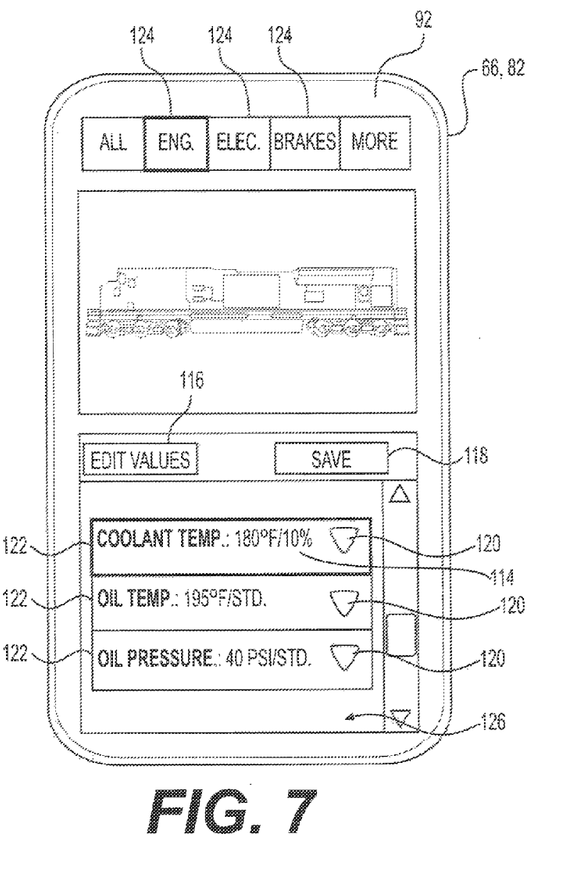

In some embodiments, controller 68 may be configured to receive a user input indicative of a desired operating parameter threshold to be associated with an operating parameter of asset 16. As shown in FIG. 7, operating parameter thresholds 122 (e.g., coolant temperature, oil temperature, oil pressure, etc.) may be listed in association with one or more of a plurality of systems 124 of asset 16, and GUI 92 may be configured to allow the user to browse a scrollable list 126 of operating parameter thresholds 122 associated with a selected system 124. Operating parameter thresholds 122 may be edited upon selection, for example, by directly editing the operating parameter threshold in text field 114 or selecting a predetermined value from a dropdown menu associated with buttons 120. Other processes of editing operating parameter thresholds may be used.

Once edited operating parameter thresholds have been entered, controller 68 may be configured to automatically generate machine control signals based on the signals generated by sensor 60 and the desired operating parameter threshold 122. GUI 92 may also include edit button 116 and/or save button 118, which may be selectable prior to or following an editing operation, respectively.

One skilled in the art will realize that the processes illustrated in this description may be implemented in a variety of ways and include other modules, programs, applications, scripts, processes, threads, or code sections that may all functionally interrelate with each other to accomplish the individual tasks described above for each module, script, and daemon. For example, these programs modules may be implemented using commercially available software tools, using custom object-oriented code written in the C++ programming language, using applets written in the Java programming language, or may be implemented with discrete electrical components or as one or more hardwired application specific integrated circuits (ASIC) that are custom designed for this purpose. Other programming languages may be used as desired.

The described implementation may include a particular network configuration but embodiments of the present disclosure may be implemented in a variety of data communication network environments using software, hardware, or a combination of hardware and software to provide the processing functions.

INDUSTRIAL APPLICABILITY

The disclosed ride through control system may be applicable to any transportation network, including subways, trolleys, and railroads. The disclosed ride through control system may increase efficiency in identifying, analyzing, and responding to operational issues that may affect the ability of a train to successfully complete a mission in accordance with a predetermined schedule. In particular, the disclosed ride through control system may allow a user to easily identify particular issues that can compromise mission success and display selectable ride through control levels for changing automated control constraints. The disclosed ride through control system may also allow users to select different ride through control levels remotely, quickly, and without assistance from onboard personnel. Further, the disclosed ride through control system may allow users to customize automated control constraints to allow operating restrictions to be reduced as broadly or as narrowly as desired. An exemplary operation of the disclosed ride through control system will now be explained.

During operation of asset 16 associated with train 14 on railroad network 10, controller 68 may receive signal(s) from sensors 60 indicative of operating parameters of asset 16 or its associated systems, subsystems, and/or components. For example, a signal generated by one of sensors 60 may be indicative of, for example, a coolant temperature, an oil temperature, an oil pressure, or another operating parameter of asset 16. Controller 68 may automatically generate machine control signals for controlling the operations of train 14 and its assets 16 based on the signals from sensors 60 and operating parameter thresholds stored within its memory or an associated storage device.

Referring to FIG. 4, controller 68 may generate maintenance messages 94 when an operating parameter, such as the coolant temperature of engine 30, exceeds an associated operating parameter threshold. Controller 68 may then display maintenance message 94 via GUI 92 by way of user interface 66, 82, as described above. Controller 68 may also display prognostic information 96 associated with maintenance message 94 via GUI 92. Prognostic information 96 may be indicative of historical operating parameter data, an associated threshold, and/or trending parameter behavior.

An operating parameter threshold of the coolant temperature may be an upper bound threshold of, for example, 180° F. When the coolant temperature (as detected via one of sensors 60) exceeds the upper bound coolant temperature threshold, controller 68 may automatically derate engine 30 (referring to FIG. 2) according to its imbedded control strategy until the coolant temperature falls below the upper bound threshold. The derating of engine 30 may result in slower travel of train 14, and the user may determine that the mission objective could be compromised if the automatic control strategy of controller 68 is allowed to continue to derate engine 30.

Upon a determination that login credentials with sufficient access and permissions have been entered, controller 68 may allow the user to then select ride through menu button 100 (or another feature on GUI 92) to view ride through control levels 98, as shown in FIG. 5. The user may then select a desired ride through control level 98, thereby adjusting operating parameter thresholds to allow train 14 to continue its mission without constant operator intervention. For instance, selection of a first subsequent ride through control level 106 may implement a raised threshold coolant temperature (e.g., 198° F.) to prevent derating of engine 30 and allow train 14 to maintain its current travel speed.

If the coolant temperature rises above the raised coolant temperature threshold associated with the first subsequent ride through control level 106, controller 68 may again attempt to derate engine 30 according to its imbedded control strategy. When the user desires to continue the mission at current travel speeds, the user may select a second subsequent ride through control level 108 to raise the coolant temperature threshold to a higher threshold (e.g., 207° F.) to allow the mission to continue as planned. If the coolant temperature rises above the threshold coolant temperature associated with second subsequent ride through control level 108, controller 68 may again attempt to derate engine 30 according to its imbedded control strategy. When the user desires to continue the mission at current speeds, the user may then select disabled threshold level 110 to permit unrestricted operations of train 14 with respect to automatic controls of asset 16 based on the coolant temperature of engine 30. It is understood that the user may select any ride through control level 98 at any time and need not select ride through control levels 98 in sequential order.

In some instances, the selection of any of ride through control levels 98 may result in the application of a blanket adjustment of a plurality of operating parameter thresholds associated with asset 16. For example, the user may select button 112 to access threshold editing features, as shown in FIG. 6, and enter a percentage increase to be applied to each operating parameter threshold upon selection of each ride through control level 98. For example, the user may type a desired operating parameter threshold into text field 114 or select a desired operating parameter from a dropdown menu associated with buttons 120.

The user may also or alternatively select a system 124 associated with asset 16 via GUI 92 in order to view list 126 of operating parameter thresholds 122 associated with system 124. The user may then edit threshold values for individual operating parameter thresholds 122 by directly editing the operating parameter threshold value within text field 114 or by selecting a desired operating parameter threshold from a dropdown menu associated with buttons 120. Once operating parameter thresholds 122 have been edited, controller 68 may be configured to automatically generate future machine control signals based on the signals generated by sensor 60 and the desired operating parameter thresholds 122. In some instances, the user may save edited parameters save button 118 on GUI 92.

Several advantages may be realized by the implementation of ride through control system 26. By using ride through control system 26, train operators and managers of railroad networks may be able to more efficiently identify, analyze, and respond to operational issues that can affect the ability of train 14 to successfully complete a mission in accordance with a predetermined schedule. In particular, ride through control system 26 may allow a user to easily identify particular issues that can compromise mission success and display selectable ride through control levels 98 for changing automated control constraints. Ride through control system 26 may also allow users to select different ride through control levels 98 remotely, quickly, and without assistance from onboard personnel. Further, ride through control system 26 may allow users to customize automated control constraints by editing operating parameter thresholds, thereby allowing operating restrictions to be reduced as broadly or as narrowly as desired.

It will be apparent to those skilled in the art that various modifications and variations can be made to the ride through control system of the present disclosure. Other embodiments of the method and system will be apparent to those skilled in the art from consideration of the specification and practice of the ride through control system disclosed herein. It is intended that the specification and examples be considered as exemplary only, with a true scope of the disclosure being indicated by the following claims and their equivalents.

What is claimed is:

1. A ride through control system for a machine having an engine, the ride through control system comprising:
   a sensor associated with an asset of the machine and configured to generate a signal indicative of an operating parameter of the asset;
   a user interface associated with the machine; and
   a controller in communication with the sensor and the user interface, wherein the controller is configured to:
      display on the user interface a plurality of selectable ride through control levels for overriding automated control of the machine, each being associated with a respective operating parameter threshold;
      receive via the user interface a user selection of one of the plurality of ride through control levels;
      automatically generate a machine control signal based on the signal generated by the sensor and the respective operating parameter threshold associated with the user selection; and
      control derating of the engine based on the user selection of one of the plurality of ride through control levels.

2. The ride through control system of claim 1, wherein each of the plurality of ride through control levels is selectable in conjunction with a user permission level.

3. The ride through control system of claim 1, wherein the plurality of ride through control levels includes a disabled threshold level in which the controller is allowed to disregard the operating parameter threshold.

4. The ride through control system of claim 1, wherein the plurality of ride through control levels includes a normal threshold level associated with a standard operating parameter threshold.

5. The ride through control system of claim 4, wherein the plurality of ride through control levels includes one or more subsequent ride through control levels, each being associated with an adjusted operating parameter threshold that is different from the standard operating parameter threshold.

6. The ride through control system of claim 5, wherein each of the one or more subsequent ride through control levels are associated with an adjustment percent from the standard operating parameter threshold.

7. The ride through control system of claim 6, wherein the user interface is configured to receive a user input in association with each of the one or more subsequent ride through control levels, the user input being indicative of a desired adjustment percent to be associated with a respective one of the one or more subsequent ride through control levels.

8. The ride through control system of claim 6, wherein the controller is configured to apply the adjustment percent to a plurality of operating parameter thresholds associated with the asset.

9. The ride through control system of claim 1, wherein:
the user interface is configured to receive a user input indicative of a desired operating parameter threshold to be associated with the operating parameter of the asset; and
automatically generate a machine control signal based on the signal generated by the sensor and the desired operating parameter threshold.

10. The ride through control system of claim 9, wherein the operating parameter is associated with one of a plurality of systems associated with the asset.

11. A method of controlling a machine having an engine, the method comprising:
sensing an operating parameter of an asset associated with the machine;
displaying a plurality of selectable ride through control levels for overriding automated control of the machine, each being associated with a respective operating parameter threshold;
receiving a user selection of one of the plurality of ride through control levels;
automatically generating a machine control signal based on the operating parameter and the respective operating parameter threshold associated with the user selection; and
controlling derating of the engine based on the user selection of one of the plurality of ride through control levels.

12. The method of claim 11, wherein each of the plurality of ride through control levels is selectable in conjunction with a user permission level.

13. The method of claim 11, wherein:
the plurality of ride through control levels includes a disabled threshold level; and
the method further includes disregarding the operating parameter threshold when the disabled threshold level is selected.

14. The method of claim 11, wherein the plurality of ride through control levels includes a normal threshold level associated with a standard operating parameter threshold.

15. The method of claim 14, wherein the plurality of ride through control levels includes one or more subsequent ride through control levels, each being associated with an adjusted operating parameter threshold that is different from the standard operating parameter threshold.

16. The method of claim 15, wherein each of the one or more subsequent ride through control levels is associated with an adjustment percent from the standard operating parameter threshold.

17. The method of claim 16, further including receiving a user input in association with each of the one or more subsequent ride through control levels, the user input being indicative of a desired adjustment percent to be associated with a respective one of the one or more subsequent ride through control levels.

18. The method of claim 16, further including applying the adjustment percent to a plurality of operating parameter thresholds associated with the asset.

19. The method of claim 11, further including:
receiving a user input indicative of a desired operating parameter threshold to be associated with the operating parameter of the asset, wherein the operating parameter is associated with one of a plurality of systems associated with the asset; and
automatically generating a machine control signal based on the operating parameter and the desired operating parameter threshold.

20. A ride through control system for a machine having an engine, the ride through control system comprising:
a sensor associated with an asset of the machine and configured to generate a signal indicative of an operating parameter of the asset;
a user interface associated with the machine; and
a controller in communication with the sensor and the user interface, wherein the controller is configured to:
display on the user interface a plurality of selectable ride through control levels for overriding automated control of the machine, each being associated with a respective operating parameter threshold, wherein the plurality of ride through control levels includes:
a disabled threshold level under which the controller is allowed to disregard the operating parameter threshold;
a normal threshold level associated with a standard operating parameter threshold; and
one or more subsequent ride through control levels, each being associated with an adjusted operating parameter threshold that is different from the standard operating parameter threshold;
receive via the user interface a user selection of one of the plurality of ride through control levels;
automatically generate a machine control signal based on the signal generated by the sensor and the respective operating parameter threshold associated with the user selection; and
control derating of the engine based on the user selection of one of the plurality of ride through control levels.

* * * * *